United States Patent
Kumar (10) Patent No.: US 9,609,579 B2
(45) Date of Patent: Mar. 28, 2017

(54) SYSTEMS AND METHODS FOR SHARING SCANNING INFORMATION

(71) Applicant: QUALCOMM Incorporated, San Diego, CA (US)

(72) Inventor: Rajeev Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/290,298

(22) Filed: May 29, 2014

(65) Prior Publication Data

US 2015/0351010 A1   Dec. 3, 2015

(51) Int. Cl.
*H04W 48/16*   (2009.01)
*H04W 84/12*   (2009.01)
*H04W 48/18*   (2009.01)

(52) U.S. Cl.
CPC .......... *H04W 48/16* (2013.01); *H04W 48/18* (2013.01); *H04W 84/12* (2013.01)

(58) Field of Classification Search
CPC ..... H04W 36/08; H04W 84/12; H04W 40/02; H04W 52/0216; H04W 52/0219; H04W 52/0245; H04W 88/02; H04W 88/08; H04W 92/18; H04W 8/005; H04W 48/16; H04W 48/18; G01S 1/024; G01S 5/02; G01S 5/0226; H04K 2203/18; H04K 3/226; H04L 41/5022; G01Q 10/04; G01Q 60/22; G01Q 80/00; G01Q 60/38; G01Q 70/02; G01Q 10/00; G01Q 60/48; G01Q 60/54
See application file for complete search history.

(56) References Cited

U.S. PATENT DOCUMENTS

| 8,462,644 | B2 | 6/2013 | Kneckt et al. |
| 2008/0081675 | A1 | 4/2008 | Pinder |
| 2009/0061862 | A1 | 3/2009 | Alberth, Jr. et al. |
| 2009/0274083 | A1* | 11/2009 | Wentink ........................ 370/311 |
| 2010/0039969 | A1* | 2/2010 | Sukenari et al. ............. 370/310 |
| 2012/0064912 | A1 | 3/2012 | Oh |

(Continued)

FOREIGN PATENT DOCUMENTS

| EP | 1187023 A1 * | 3/2002 |
| EP | 2621220 A1 | 7/2013 |

(Continued)

OTHER PUBLICATIONS

J. Helttunen—Improved Bluetooth network formation (IBNF)—Date of Conference: Nov. 6-8, 2002.*

(Continued)

*Primary Examiner* — Nizar Sivji
(74) *Attorney, Agent, or Firm* — Paradice and Li LLP (57) ABSTRACT

Systems and methods are disclosed for facilitating a scanning process to obtain information about available WLANs operating within range. Scanning information already obtained by one or more wireless communications devices may be shared with another wireless communications device, thereby reducing the time spent by performing scans by other wireless communications device. As desired, shared scanning information may be used preferentially depending on one or more metrics characterizing the information, such as the age of the scanning information or the relative distance to the sharing wireless communications device.

18 Claims, 5 Drawing Sheets

(56) References Cited

U.S. PATENT DOCUMENTS

| | | | |
|---|---|---|---|
| 2012/0170556 A1* | 7/2012 | Tsfati et al. | 370/338 |
| 2013/0010766 A1* | 1/2013 | Sadek et al. | 370/336 |
| 2013/0294232 A1* | 11/2013 | Segev et al. | 370/230 |
| 2014/0010157 A1* | 1/2014 | Hsieh | H04W 48/16 370/328 |
| 2014/0010220 A1 | 1/2014 | Huang | |
| 2015/0124793 A1* | 5/2015 | Jeong et al. | 370/338 |

FOREIGN PATENT DOCUMENTS

| | | | |
|---|---|---|---|
| GB | 2410153 A | | 7/2005 |
| WO | WO 0239665 A2 | * | 5/2002 |
| WO | WO 2005088913 A1 | * | 9/2005 |
| WO | 2008020285 A2 | | 2/2008 |

OTHER PUBLICATIONS

WiFiFoFum—WiFi Scanner, Dynamically Loaded Ltd., Nov. 28, 2013, < URL: https://play.google.com/store/apps/details?id=com.dynamicallyloaded.wififofum >, 2 pages.

International Search Report and Written Opinion—PCT/US2015/032557—ISA/EPO—Aug. 26, 2015.

WiFiFoFum—WiFi Scanner, Dynamically Loaded Ltd., Nov. 28, 2013, , 2 pages.

\* cited by examiner

SYSTEMS AND METHODS FOR SHARING SCANNING INFORMATION

FIELD OF THE PRESENT DISCLOSURE

This disclosure generally relates to wireless communication systems and more specifically to systems and methods for facilitating gathering information about available wireless networks.

BACKGROUND

Wireless local area networks (WLANs) conforming to specifications in the Institute of Electrical and Electronics Engineers ("IEEE") 802.11 family typically involve a basic service set (BSS) managed by a device acting in the role of an access point (AP). Each BSS may be identified by a service set identifier (SSID), such that a wireless communications device using a WLAN protocol may receive broadcast messages or beacons from access points within range advertising the SSID of their associated networks. The wireless communications device may then manually or automatically select the one or more of the detected networks and perform an association process to create one or more communications links. In order to identify suitable access points and thereby utilize available WLANs, a wireless communications device may perform scans on the wireless channels of one or more frequency bands. Existence of available networks may be determined passively by spending a period of time on a WLAN channel to receive any beacons that are periodically broadcast by APs operating on that channel or actively by sending a probe request that triggers a probe response sent by an AP receiving the transmission. The scanning process may be used to find usable networks prior to association or may be performed as a background process after associating with one network to determine the availability of alternative networks that may have more desirable characteristics. Scanning may also be performed to assess channel conditions and profile network characteristics.

Accordingly, a wireless communications device may spend a considerable amount of time to complete a comprehensive scan of the available wireless channels. During this time, the transceiver of the wireless communications device may be devoted to the scanning process and unable to perform other operations. As such, it would be desirable to decrease the amount of time devoted to the scanning process to free the transceiver for other tasks. Further, since the wireless communications device must be in active mode rather than a power saving mode when performing the scanning process, a significant amount of energy consumption may also be involved. Particularly for battery powered mobile devices, it would be desirable to minimize the amount of energy used by a wireless communications device to obtain information about nearby access points.

In light of these goals, this disclosure provides systems and methods to facilitate the scanning process, such as by identifying available networks more quickly. These and other aspects are described below in the materials that follow.

SUMMARY

This specification discloses a method for sharing scanning information that may include transmitting a probe request with a first wireless communications device and receiving shared scanning information from a second wireless communications device that is transmitted in response to the probe request. As desired, the shared scanning information may include a metric determined by the second wireless communications device characterizing the scanning information. Further, the first wireless communications device may selectively employ the shared scanning information received from the second wireless communications device based, at least in part, on the metric determined by the second wireless communications device.

In one aspect, the first wireless communications device may receive shared scanning information from at least one additional wireless communications device that is transmitted in response to a probe request. The shared scanning information received from the at least one additional wireless communications device may include a metric determined by the at least one additional wireless communications device and the first wireless communications device may selectively employ the shared scanning information received from the second wireless communications device and the shared scanning information received from the at least one additional wireless communications device based, at least in part, on the metric determined by the second wireless communications device and the metric determined by the at least one additional wireless communications device.

In one aspect, the first wireless communications device may determine a metric characterizing the shared scanning information received from the second wireless communications device and may selectively employ the shared scanning information based, at least in part, on the metric determined by the first wireless communications device.

In one aspect, the first wireless communications device may transmit the probe request as part of a scanning process that includes receiving scanning information as a probe response transmitted by an access point or a beacon transmitted by an access point. The first wireless communications device may terminate the scanning process based, at least in part, on at least one of a metric determined by the second wireless communications device characterizing the scanning information and a metric determined by the first wireless communications device characterizing the scanning information. As desired, the metric determined by the second wireless communications device may be a time metric; the metric determined by the first wireless communications device may be a distance metric; and the scanning process may be terminated when the time metric meets a first threshold and the distance metric meets a second threshold.

This disclosure also includes a wireless communications device for sharing scanning information having a WLAN module and a scanning manager, wherein the scanning manager may transmit a probe request with the WLAN module and process shared scanning information received from another wireless communications device that is transmitted in response to the probe request. The shared scanning information may include a metric determined by the other wireless communications device characterizing the scanning information.

In one aspect, the scanning manager may selectively employ the shared scanning information received from the other wireless communications device based, at least in part, on the metric determined by the other wireless communications device.

In one aspect, the scanning manager may process shared scanning information received from a plurality of additional wireless communications devices, each of which is transmitted in response to a probe request. The shared scanning information received from the plurality of wireless communications devices may include a metric determined by each of the plurality of additional wireless communications devices such that the scanning manager may selectively employ the shared scanning information received from the plurality of additional wireless communications devices based, at least in part, on the metrics determined by each of the plurality of additional wireless communications devices.

In one aspect, the scanning manager may determine a metric characterizing the shared scanning information received from the other wireless communications device and may selectively employ the shared scanning information based, at least in part, on the metric.

In one aspect, the scanning manager may transmit the probe request as part of a scanning process that includes receiving scanning information comprising at least one of a probe response transmitted by an access point and a beacon transmitted by an access point. The scanning manager may also terminate the scanning process based, at least in part, on at least one of a metric determined by the other wireless communications device characterizing the scanning information and a metric determined by the scanning manager. As desired, the metric determined by the other wireless communications device may be a time metric; the metric determined by the scanning manager may be a distance metric; and the scanning manager may terminate the scanning process when the time metric meets a first threshold and the distance metric meets a second threshold.

This disclosure also includes a wireless communications device for sharing scanning information having a WLAN module and a scanning manager, wherein the scanning manager may obtain scanning information and may transmit the scanning information using the WLAN module to another wireless communications device when the WLAN module receives a probe request from the other wireless communications device. The scanning manager may also determine a metric characterizing the scanning information and may include the metric in the scanning information transmitted to the other wireless communications device.

BRIEF DESCRIPTION OF THE DRAWINGS

Further features and advantages will become apparent from the following and more particular description of the embodiments of the disclosure, as illustrated in the accompanying drawings, and in which like referenced characters generally refer to the same parts or elements throughout the views, and in which.

DETAILED DESCRIPTION OF THE INVENTION

At the outset, it is to be understood that this disclosure is not limited to particularly exemplified materials, architectures, routines, methods or structures as such may vary. Thus, a number of such options, similar or equivalent to those described herein, can be used in the practice or embodiments of this disclosure.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system.

Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Further, embodiments are discussed in specific reference to wireless networks. As such, this disclosure is applicable to any suitable wireless communication systems having the necessary characteristics. Although discussed in specific reference to an infrastructure WLAN, the techniques of this disclosure may be applied to other network configurations, to other wireless communication systems or to other wireless protocols involving scanning for available networks. For example, one of skill in the art will recognize that these techniques may be applied when the access point functionality is embedded in other devices of an information handling system such as, for example, routers, switches, servers, computers, or the like, and the designation as an AP is not limited to dedicated access point devices.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As noted above, this disclosure provides systems and methods for facilitating a scanning process and enable a wireless communications device to obtain information about available WLANs operating within range. In one aspect, this may be accomplished by sharing scanning information already obtained by one or more wireless communications devices, thereby reducing the time spent by performing scans by another wireless communications device operating in the same vicinity. Correspondingly, the other wireless communications device may either spend a greater period of time in a power save mode to reduce power consumption or utilize the transceiver to conduct other network operations. As will be appreciated, a wireless communications device operating in a given area may be within range of other devices that have already performed a scanning process or otherwise have obtained scanning information. By utilizing already obtained scanning information, the wireless communications device may be able to lessen or avoid time spent performing the scanning process itself.

Thus, in the context of this disclosure, the term "scanning information" includes any information that may be obtained in a conventional active or passive scan. For example, in addition to the SSIDs of any active WLANs, scanning information may also include information requested in a probe request or included in a beacon regarding operation of each WLAN, such as supported rates, parameter sets and/or capability requirements. Scanning information may also include one or more metrics associated with the obtained information. For example, a timing metric may be used to indicate when a particular piece of scanning information was obtained. Further, an AP distance metric may be used to indicate a location of the AP relative to the obtaining STA. Relative distance between wireless communications devices may be determined in any suitable manner as known in the art, including signal strength, such as in the form of received signal strength indication (RSSI), external positioning information from global positioning satellites (GPS) systems, ranging techniques, WiFi or cellular positioning and others. Still further, a quality metric may be used to indicate any qualitative or quantitative measure of actual or anticipated performance regarding the AP. As one example, the obtaining STA may be aware of channel conditions such as congestion that may affect throughput or response times. In another aspect, the obtaining STA may be associated with the AP for which scanning information is being shared and may have a direct measure of network performance. As desired, any other suitable metric may be associated with the scanning information.

In addition, the term "shared scanning information" refers to any scanning information obtained from another wireless communications device regarding a WLAN not managed by the other wireless communications device. As indicated, shared scanning information may often be received from a wireless communications device acting in the role of a STA. However, when an AP has scanning information regarding WLANs other than the one it manages, the AP may share such information with other wireless communications devices according to the techniques of this disclosure. Further, a wireless communications device may act in multiple roles, such as in the case of device configured to act as a software-enabled AP (softAP), that may also function as a STA.

Figure 1:
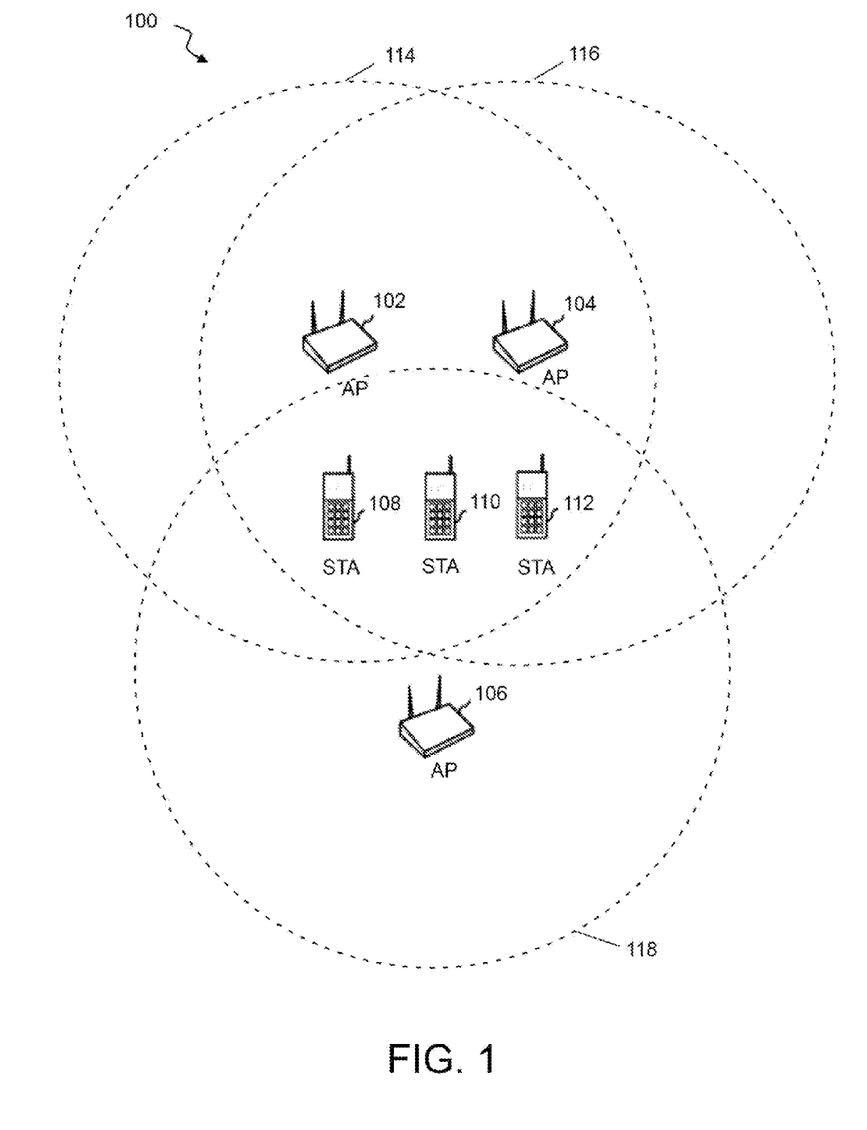
FIG. 1 schematically depicts a wireless environment including WLANs operated by respective APs, according to one embodiment.

The systems and methods of this disclosure may be described in reference to an exemplary wireless network environment 100 as shown in FIG. 1, which may include one or more wireless communications devices acting in the role of an AP, each managing a WLAN, and one or more wireless communications devices acting in the role of a STA, that may be associated with or seeking to associate with one of the APs. In this example, three APs, AP 102, AP 104 and AP 106, and three wireless communications devices, STA 108, STA 110 and STA 112, are depicted, but the techniques of this disclosure may accommodate any number of APs and STAs. AP 102, AP 104 and AP 106 may be operating on the same wireless channel or on different channels and/or frequency bands and each independently manages WLAN 114, WLAN 116 and WLAN 118, respectively. STA 108 may perform a conventional scanning process, including active or passive scanning, to obtain scanning information such as the respective SSIDs and other association parameters from AP 102, AP 104 and AP 106. STA 108 may also correlate any desired metric that may be used to characterize the scanning information as described above.

According to the techniques of this disclosure, STA 110 may then initiate its own scanning process to identify available WLANs. In one aspect, STA 110 may broadcast a probe request on a first wireless channel and may then monitor that channel for any probe responses or any beacon transmissions that may indicate the availability of a WLAN on the channel. STA 110 may repeat the process as desired on additional wireless channels and/or frequency bands. When STA 110 broadcasts a probe request on the wireless channel on which STA 108 is operating, STA 108 may respond to the probe request with a unicast transmission containing any or all scanning information that it has obtained. For example, STA 108 may select which scanning information to share based, at least in part, on one or more of the metrics used to characterize the scanning information. In the context of this example, STA 108 may have obtained scanning information for AP 102, AP 104 and AP 106, or a subset of these, and therefore may transmit this information to STA 110. Upon receipt of the shared scanning information from STA 108, STA 110 may select one of the APs to associate with or may continue to perform the conventional scanning as desired.

In another aspect, STA 110 may also receive shared scanning information in response to its probe request from STA 112, which may also have completed a conventional scanning process or may have received scanning information from another source, such as by receiving shared scanning information from another wireless communications device in range (not shown in this example). As will be appreciated, STA 110 may continue to perform operations associated with a conventional scanning process including switching wireless channels and sending additional probe requests. Thus, STA 112 may share scanning information after receiving the probe request sent by STA 110 that was received by STA 108, or may receive another probe request sent by STA 110 transmitted on the same or a different wireless channel. Upon receipt of shared scanning information from multiple obtaining STAs, STA 108 may select which shared scanning information to employ based, at least in part, on the metrics or any other suitable criteria.

Figure 2:
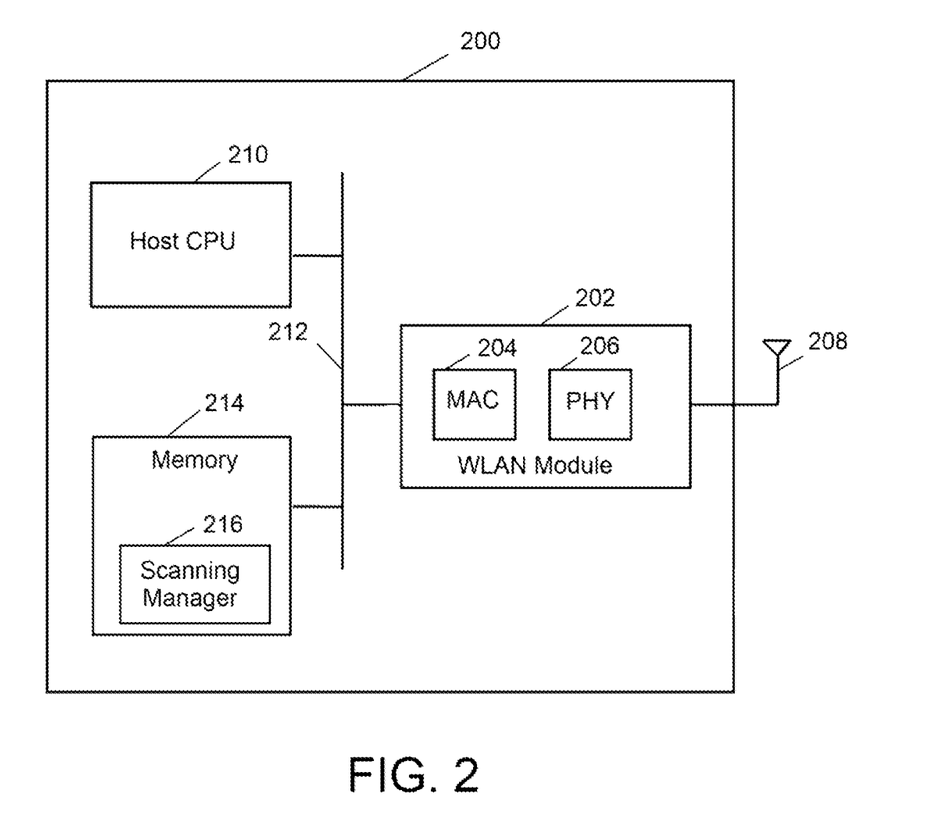
FIG. 2 schematically depicts functional blocks of a wireless communications device configured for sharing scanning information, according to one embodiment.

To help illustrate aspects associated with this disclosure, FIG. 2 depicts high level functional blocks of one embodiment of a wireless communications device 200 that may be configured to function in the role of a station sharing scanning information, such as STA 108 or STA 112, or a station receiving shared scanning information, such as STA 110. As shown, wireless communications device 200 may employ an architecture in which the lower levels of the wireless protocol stack are implemented through firmware and/or hardware in respective subsystems. Wireless communications device 200 may therefore include wireless protocol circuitry as indicated by WLAN module 202, having media access controller (MAC) 204 to perform functions related to the handling and processing of frames of data including verification, acknowledgment, routing, formatting and the like. Incoming and outgoing frames are exchanged between MAC 204 and physical layer (PHY) 206, which may include the functions of modulating the frames according to the relevant 802.11 protocol as well as providing the analog processing and RF conversion necessary to provide transmission and reception of wireless signals through antenna 208. Although one antenna is depicted for the purpose of illustration, wireless communications device 200 may employ multiple antennas if desired, such as to enable the use of multiple streams.

Wireless communications device 200 may also include host CPU 210 configured to perform the various computations and operations involved with the functioning of wireless communications device 200, in its role as either STA 108 or STA 110. Host CPU 210 may be coupled to WLAN module 202 through bus 212, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the wireless protocols may be implemented in software stored in memory 214 that may be accessed by host CPU 210 over bus 212.

Figure 3:
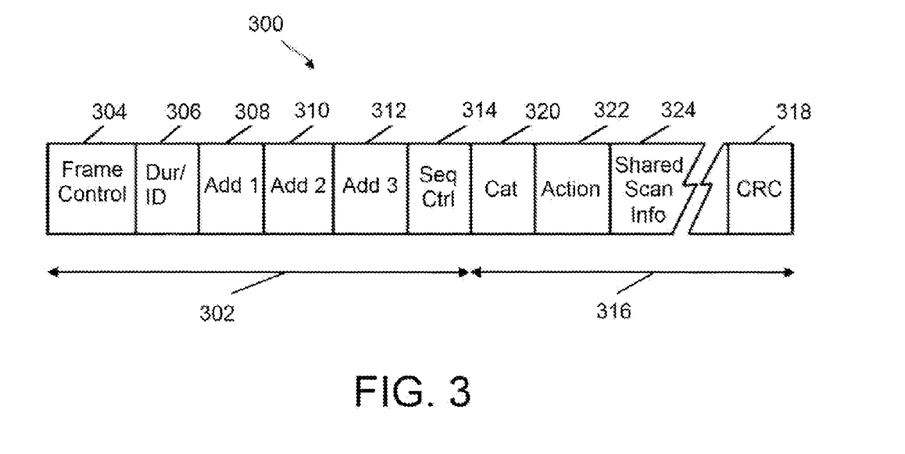
FIG. 3 schematically depicts the format of an action management frame, according to one embodiment.

In the embodiment shown, wireless communications device 200 includes scanning manager 216 configured to share or receive shared scanning information using WLAN module 202. For example, when acting in the role of STA 108 (or STA 112) having already obtained scanning information, scanning manager 216 may be configured to share the scanning information by transmitting some or all of the information using WLAN module 202 to STA 110 in response to receiving a probe request. In one aspect, STA 108 may share the scanning information by transmitting a unicast action management frame having the general format shown in FIG. 3. As depicted, management frame 300 may include a MAC header 302, containing the frame control 304, duration/ID 306, address fields 308, 310 and 312 and sequence control field 314. To route the unicast frame from STA 108 to STA 110, for example, address field 308 may identify the MAC address of STA 110 and address fields 310 and 312 may identify the MAC address of STA 108. Frame 300 further includes a variable length frame body 316 and cyclic redundancy check (CRC) field 318. Frame control 304 segment of MAC header 302 includes fields providing various types of control information, including an identification of the 802.11 protocol of the frame, the type and subtype of the frame, distribution system information, information regarding additional information to be transmitted, security and order information. CRC field 318 may be employed to provide a frame check sequence (FCS) function. Frame body 316 may be used to convey the shared scanning information in any suitable format. Category field 320 may be used to identify the type of action frame and action field 322 may identify the action to be taken. Variable length action field 322 may include a sufficient number of suitably configured information elements (IEs) to convey the shared scanning information, including any metrics determined by STA 108.

Further, when wireless communications device 200 is acting in the role of STA 110 and is seeking scanning information, scanning manager 216 may cause the broadcast of a probe request and may process any shared scanning information received in response. In the depicted embodiment, scanning manager 216 may be implemented as processor-readable instructions stored in memory 214 that may be executed by host CPU 210. However, it will be appreciated that scanning manager 216 may be implemented in any location using any combination of software, firmware and hardware as desired. As will be appreciated, scanning manager 216 may cooperate with MAC 204 to transmit probe requests, to receive beacons and/or probe responses as well as to receive shared scanning information. Depending upon the implementation and capabilities of wireless communications device 200, this may include operating on one or more wireless channels located in one or more frequency bands.

When operating in the context of STA 110, scanning manager 216 may gather all received shared scanning information as well as any conventionally obtained scanning information and subsequently initiate an association procedure with a selected AP, such as AP 102, AP 104 or AP 106. Scanning manager 216 may employ any criterion or combination of criteria when selecting an AP for association. In one aspect, scanning manager 216 may select an AP using any of the metrics included with the shared scanning information. For example, scanning manager 216 may employ any timing metric included with the shared scanning information to preferentially weight information that was obtained more recently. Similarly, the AP distance and/or quality metric in any combination may also be used when selecting an AP for association. Alternatively or in addition to any metrics determined by the obtaining STA, scanning manager 216 may determine one or more metrics to characterize the received shared scanning information. As described above, suitable metrics may include a timing metric to indicate when wireless communications device 200 received the shared scanning information, a STA distance metric to how far the wireless communications device that obtained the shared scanning information is from wireless communications device 200, a quality metric and/or the like. Thus, as an additional example, scanning manager 216 may employ a STA distance metric to preferentially weight shared scanning information received from a more proximate wireless communications device under the assumption that such information is more likely represent WLANs that will be available to wireless communications device 200.

Figure 4:
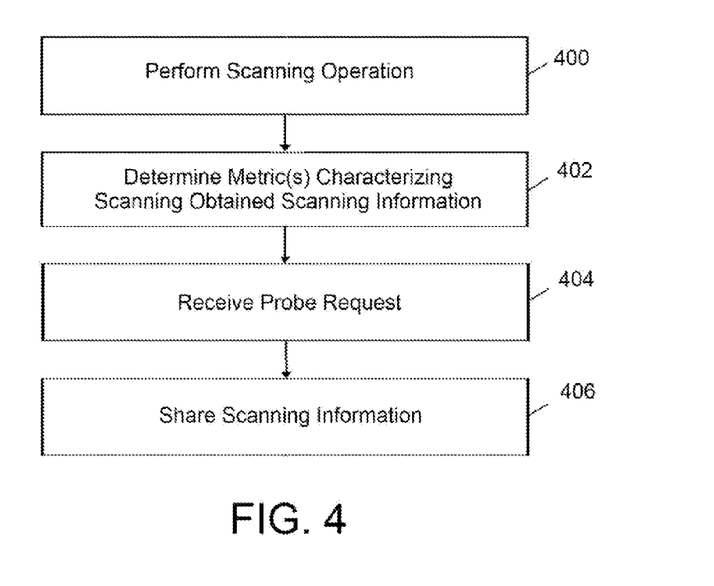
FIG. 4 is a flowchart showing an exemplary routine for sharing scanning information, according to one embodiment.

To help illustrate aspects of the disclosure, the flowchart depicted in FIG. 4 represents one embodiment in the context of STA 108. As shown, a suitable routine may begin in 400 with STA 108 performing a conventional scanning process. The scan may be active, passive or any combination thereof. STA 108 may also receive shared scanning information from another suitably configured wireless communications device. As desired, in 402 STA 108 may determine one or more metrics that characterize the scanning information. In 404, STA 108 may receive a probe request from a wireless communications device seeking to obtain scanning information. In response to the probe request, STA 108 may transmit scanning information it has obtained in 406. As noted, STA 108 may share all currently stored scanning information or a subset of the information depending on any suitable criteria. In one aspect, STA 108 may select scanning information to share based, at least in part, on one or more metrics that characterize the scanning information. For example, STA 108 may share only scanning information that was obtained within a configurable period of time from when the probe request was received.

Figure 5:
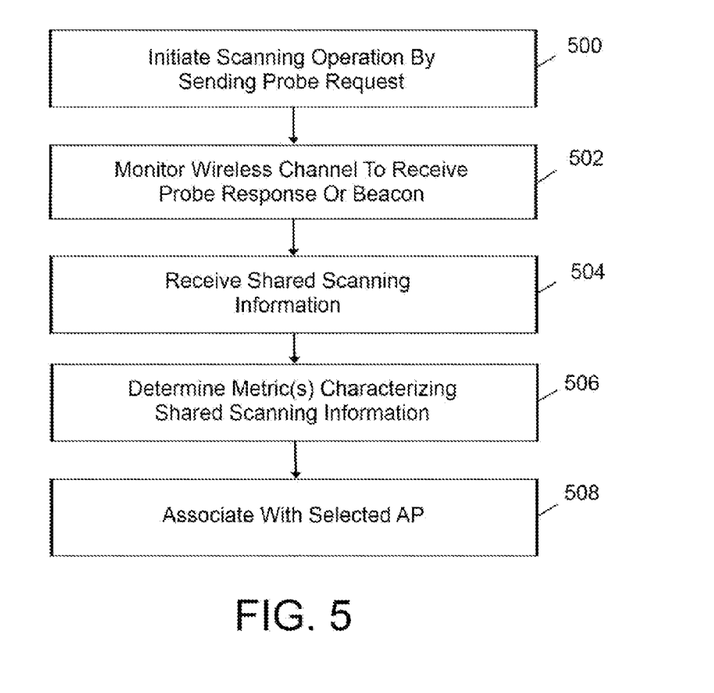
FIG. 5 is a flowchart showing an exemplary routine for obtaining and utilizing shared scanning information, according to one embodiment.

Similarly, the flowchart depicted in FIG. 5 represents another embodiment in the context of STA 110. As shown, a suitable routine may begin in 500 with STA 110 initiating an active scanning process by transmitting a probe request specifying a broadcast SSID. In 502, STA 110 may receive conventionally obtained scanning information, such as in the form of probe responses or beacons from any APs within range. In 504, STA 110 may also obtain shared scanning information from any suitably configured wireless communications device that received the broadcast probe response. In one aspect, STA 110 may determine one or more metrics that characterize the shared scanning information. Accordingly, STA 110 may select an AP to associate with in 508 based, at least in part, on the shared scanning information and on any suitable criteria, such as any of the metrics described above as determined by either or both of STA 108 and STA 110.

Figure 6:
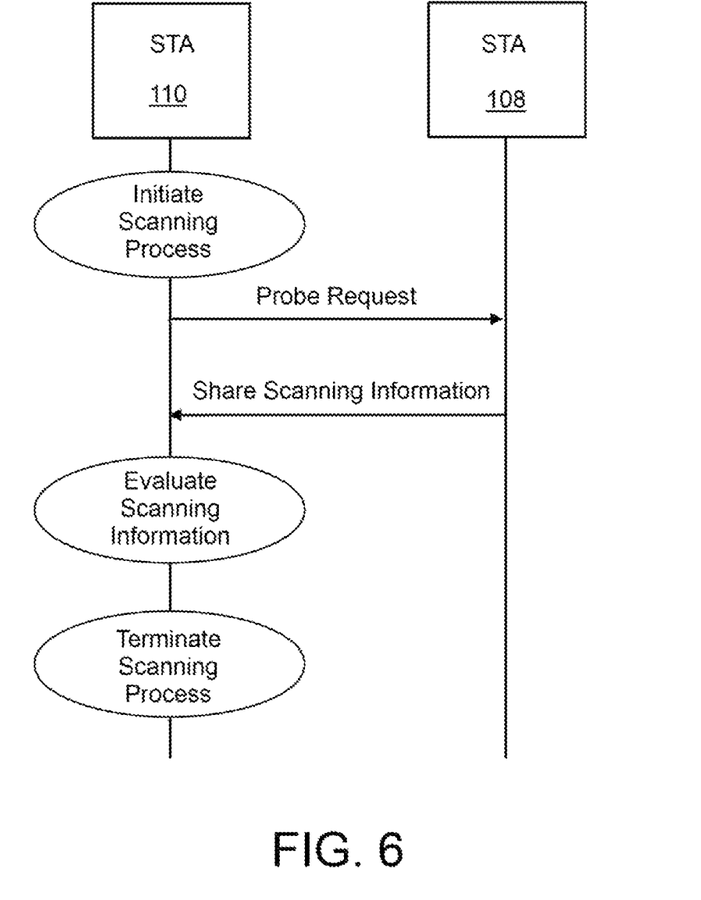
FIG. 6 is a sequence diagram showing coordination between wireless communications devices to share scanning information, according to one embodiment.

In one aspect, STA 110 may be configured to reduce power expenditure associated with performing a scanning operation. To help clarify these features, FIG. 6 illustrates a sequence diagram showing the coordination of STA 110 with another wireless communications device sharing scanning information, such as STA 108. As shown, STA 110 may transmit a probe request to initiate a scanning process according to the techniques of this disclosure. STA 108 then monitors the wireless channel to receive any probe responses or beacons. Upon receiving the probe request, STA 108 may respond by sharing scanning information as indicated. Next, STA 110 may evaluate the received shared scanning information. If the received shared scanning information meets specified criteria, STA 110 may end the scanning process. For example, if the timing metric determined by STA 108 meets a suitable age threshold and if the STA distance metric determined by STA 110 indicates STA 108 is sufficiently close that its scanning information may be considered applicable, STA 110 may cease the scanning process and use the shared scanning information to associate with an identified AP. As will be appreciated, any one or combination of metrics determined by STA 110 or STA 108 may be used by scanning manager 216 in the evaluation of the shared scanning information. Accordingly, when shared scanning information is received that is considered sufficient, STA 110 may end the scanning process without the conventional requirement of actively or passively scanning on each desired wireless channel. Thus, by reducing the amount of time spent scanning, STA 110 may free WLAN module 202 to perform other tasks or may operate WLAN module 202 in a power save mode to conserve resources.

Described herein are presently preferred embodiments. However, one skilled in the art that pertains to the present invention will understand that the principles of this disclosure can be extended easily with appropriate modifications to other applications.

What is claimed is:

1. A method for sharing scanning information, the method being performed by a first wireless station (STA), comprising:
    broadcasting, by the first STA, a probe request on a first wireless channel to scan the first wireless channel for available networks;
    receiving, at the first STA, shared scanning information from a second STA in response to the probe request, wherein the shared scanning information includes scanning information obtained by the second STA when scanning for wireless networks managed by one or more access points (AP)s and a first metric indicating a time at which the scanning information was obtained by the second STA; and
    associating the first STA with a first AP of the one or more APs based at least in part on the shared scanning information received from the second STA.

2. The method of claim 1, further comprising selectively employing the shared scanning information received from the second STA based, at least in part, on the first metric.

3. The method of claim 1, further comprising receiving additional shared scanning information from a third STA in response to the probe request.

4. The method of claim 3, wherein the additional shared scanning information includes a second metric determined by the third STA, the method further comprising:
    selectively employing the shared scanning information received from the second STA and the additional shared scanning information received from the third STA based, at least in part, on the first metric and the second metric.

5. The method of claim 1, further comprising determining a third metric indicating respective distances between the second STA and each of the one or more APs.

6. The method of claim 5, wherein broadcasting the probe request is a part of a scanning process that includes receiving at least one of a probe response or a beacon from an AP.

7. The method of claim 6, further comprising terminating the scanning process based, at least in part, on at least one of the first metric or the third metric.

8. The method of claim 7, wherein the scanning process is terminated if at least one of the first metric meets a first threshold or the third metric meets a second threshold.

9. A wireless station (STA) comprising:
    one or more processors; and
    a memory storing instructions that, when executed by the one or more processors, causes the STA to:
        broadcast a probe request on a first wireless channel to scan the first wireless channel for available networks;
        receive shared scanning information from another STA in response to the probe request, wherein the shared scanning information includes scanning information obtained by the other STA when scanning for wireless networks managed by one or more access points (AP)s and a first metric indicating a time at which the scanning information was obtained by the other STA; and
        associate with a first AP of the one or more APs based at least in part on the shared scanning information received from the other STA.

10. The STA of claim 9, wherein execution of the instructions further causes the STA to selectively employ the shared scanning information received from the other STA based, at least in part, on the first metric.

11. The STA of claim 9, wherein execution of the instructions further causes the STA to process additional shared scanning information received from a plurality of additional STA in response to the probe request.

12. The STA of claim 11, wherein the additional shared scanning information includes respective metrics determined by each of the plurality of additional STAs, and wherein execution of the instructions further causes the STA to:
    selectively employ the additional shared scanning information based, at least in part, on the respective metrics determined by each of the plurality of additional STAs.

13. The STA of claim 9, wherein execution of the instructions further causes the STA to determine a second metric indicating respective distances between the other STA and each of the one or more APs.

14. The STA of claim 13, wherein execution of the instructions to broadcast the probe request causes the STA to transmit the probe request as part of a scanning process that includes receiving at least one of a probe response or a beacon from an AP.

15. The STA of claim 14, wherein execution of the instructions further causes the STA to terminate the scanning process based, at least in part, on at least one of the first metric or the second metric.

16. The STA of claim 15, wherein the scanning process is terminated if at least one of the first metric meets a first threshold or the second metric meets a second threshold.

17. A wireless station (STA) communications device for sharing scanning information, comprising:
one or more processors; and
a memory storing instructions that, when executed by the one or more processors, causes the STA to:
scan one or more wireless channels to identify available networks; and
receive a probe request from another STA, wherein the probe request is configured to trigger a probe response from an access point (AP); and
transmit scanning information to the other STA in response to the probe request, wherein the scanning information includes information obtained, during the scan, for at least one of the available networks and a first metric indicating a time at which the information was obtained by the STA.

18. The STA of claim 17, wherein the scanning information further includes a second metric indicating a distance between the STA and an AP of the at least one of the available networks.

* * * * *